United States Patent
Zhou et al.

(10) Patent No.: US 9,832,111 B2
(45) Date of Patent: Nov. 28, 2017

(54) OFS IN-BAND COMMUNICATION METHOD AND OFS

(71) Applicant: Huawei Technologies Co., Ltd., Shenzhen (CN)

(72) Inventors: Zaifu Zhou, Shenzhen (CN); Huan Zhang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 210 days.

(21) Appl. No.: 14/949,506

(22) Filed: Nov. 23, 2015

(65) Prior Publication Data
US 2016/0080254 A1 Mar. 17, 2016

Related U.S. Application Data

(63) Continuation of application No. PCT/CN2014/075602, filed on Apr. 17, 2014.

(30) Foreign Application Priority Data

May 24, 2013 (CN) .......................... 2013 1 0198601

(51) Int. Cl.
*H04L 12/26* (2006.01)
*H04L 12/721* (2013.01)
(Continued)

(52) U.S. Cl.
CPC .......... *H04L 45/38* (2013.01); *H04L 12/6418* (2013.01); *H04L 43/0811* (2013.01);
(Continued)

(58) Field of Classification Search
CPC ....... H04L 43/0811; H04L 43/50; H04L 45/18
See application file for complete search history.

(56) References Cited

U.S. PATENT DOCUMENTS 9,104,643 B2 * 8/2015 DeCusatis ........... G06F 11/2005
9,654,380 B1 * 5/2017 Ramasubramanian . H04L 41/12
(Continued)

FOREIGN PATENT DOCUMENTS

CN 101394346 A 3/2009
CN 102685006 A 9/2012
(Continued)

OTHER PUBLICATIONS

"OpenFlow Switch Specification," Version 1.2 (Wire Protocol 0x03), pp. 1-82, Open Networking Foundation, Palo Alto, California (Dec. 5, 2011).

*Primary Examiner* — Raj Jain
(74) *Attorney, Agent, or Firm* — Leydig, Voit & Mayer, Ltd.

(57) ABSTRACT

An OFS in-band communication method and an OFS are disclosed. The method includes: receiving an LLDP data packet; creating a controller list entry or updating a controller list entry when it is determined, by using a role sub-field, that a sender type of the received LLDP data packet is OFC; acquiring a first-time TCP handshake packet used for establishing a TCP connection, and checking, according to a destination MAC and a destination IP that are carried in the TCP handshake packet, whether a corresponding controller list entry exists in a controller list; and if yes, updating a flow entry according to the MAC, the IP, and the in_port in the corresponding controller list entry in the controller list, so that an OFS can forward, by using a flow table, a packet to be sent to an OFC to the OFC.

22 Claims, 7 Drawing Sheets

(51) Int. Cl.
*H04L 12/64* (2006.01)
*H04L 12/751* (2013.01)
*H04L 12/741* (2013.01)

(52) U.S. Cl.
CPC .............. *H04L 43/50* (2013.01); *H04L 45/10* (2013.01); *H04L 45/26* (2013.01); *H04L 45/745* (2013.01); *Y02B 60/43* (2013.01)

(56) References Cited

U.S. PATENT DOCUMENTS

| | | |
|---|---|---|
| 2009/0083438 A1 | 3/2009 | Matsumoto et al. |
| 2014/0244810 A1* | 8/2014 | Chen ................... H04L 61/2076 709/221 |
| 2015/0003259 A1* | 1/2015 | Gao ....................... H04L 45/18 370/244 |
| 2016/0080254 A1* | 3/2016 | Zhou ................... H04L 12/6418 370/392 |

FOREIGN PATENT DOCUMENTS

| | | |
|---|---|---|
| CN | 102985006 A | 9/2012 |
| CN | 102821009 A | 12/2012 |
| CN | 102946327 A | 2/2013 |
| CN | 103259728 A | 8/2013 |
| CN | 104579968 A | 4/2015 |
| JP | 2008187686 A | 8/2008 |

\* cited by examiner

| A software module receives a packet_in message sent by a hardware module, and parses the packet_in message to determine whether the packet_in message is an LLDP-type packet_in message | ~221 |

| When the received packet_in message is the LLDP-type packet_in message, the software module of an OFS obtains an LLDP data packet by parsing the LLDP-type packet_in message, and obtains a role sub-field by parsing a TLV field in the LLDP data packet | ~222 |

| When it is determined, according to the role sub-field, that a sender type of the received LLDP data packet is OFC, the software module of the OFS obtains a MAC and an IP of a sender by parsing the TLV field in the LLDP data packet, and obtains, by parsing the LLDP-type packet_in message, a port in_port through which the OFS receives the LLDP data packet | ~223 |

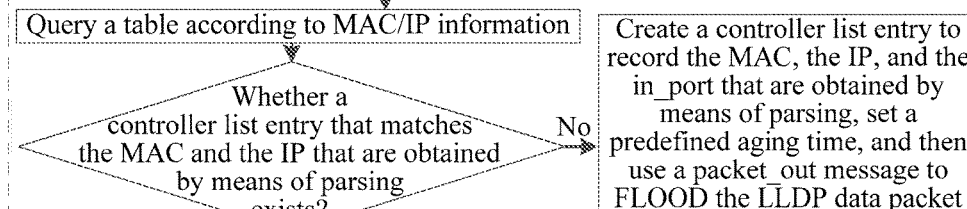

224

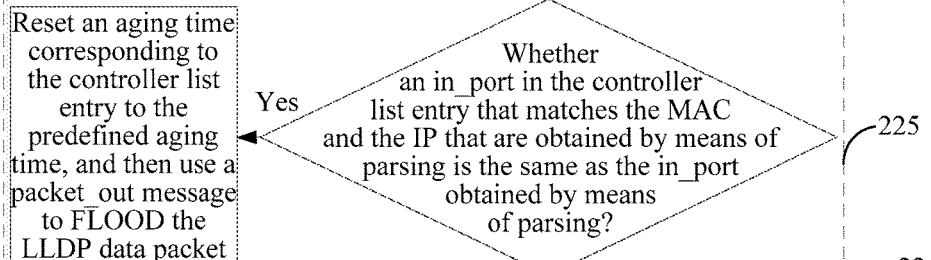

225

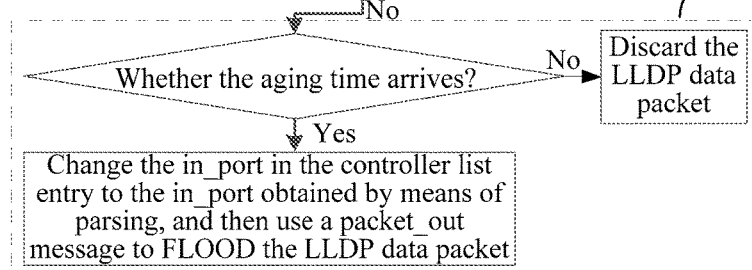

OFS IN-BAND COMMUNICATION METHOD AND OFS

CROSS-REFERENCE TO RELATED APPLICATIONS

This application is a continuation of International Patent Application No. PCT/CN2014/075602, filed on Apr. 17, 2014, which claims priority to Chinese Patent Application No. 201310198601.3, filed on May 24, 2013, both of which are hereby incorporated by reference in their entireties.

TECHNICAL FIELD

The present invention relates to the field of network communications technologies, and in particular, to an OFS in-band communication method and an OFS.

BACKGROUND

That a control plane is separated from a forwarding plane is a basic feature of an SDN (Software-Defined Networking)/OpenFlow. A routing policy is formulated for the control plane based on a network-wide view, and a data packet is processed on the forwarding plane according to a received routing policy. To establish a TCP connection between an OFS (OpenFlow switch) and an OFC (OpenFlow controller) is a basic premise on which an OpenFlow network can work normally.

Currently, an out-of-band connection mode is generally used between the OFS and the OFC. FIG. 1 is a networking diagram of an existing out-of-band connection mode. The control plane and the forwarding plane include two different physical networks each. The control plane includes switches Switch, OFS1, OFS2, OFS3, OFS4, OFS5, and OFS6, and a controller OF_Controller, and a data plane (this means a forwarding plane) includes switches OFS1, OFS2, OFS3, OFS4, OFS5, and OFS6.

In a network shown in FIG. 1, the Switch first connects to the control plane based on protocols such as LLDP and STP in a working mode of a traditional switch, that is, the Switch implements forwarding of various OpenFlow control messages by using a MAC table generated by protocols such as STP, where the control messages refer to various messages such as a Controller-to-Switch message, an Asynchronous message, and a Symmetric message that are defined in the OpenFlow specification. After the Switch is connected to the control plane, the OFC may deliver an initial flow entry to the OFS. After receiving the flow entry, the OFS adds the flow entry to a corresponding flow table, so that a data packet can be processed according to the flow table.

A main disadvantage of this solution is that two independent physical networks and two network management systems (one is used to manage a network on the control plane, and the other is used to manage a flow switching network on the forwarding plane) need to be maintained, and costs are relatively high.

SUMMARY (1) Technical Problem to be Resolved

The technical problem to be resolved in the present invention is how to provide an OFS in-band communication method and an OFS, so as to reduce networking costs.

(2) Technical Solutions

According to a first aspect, the present invention provides an OFS in-band communication method, where the method is executed by an OFS, the OFS includes a controller list, the controller list is used to store one or more controller list entries, the controller list entry includes a MAC and an IP of a local OpenFlow controller OFC, and a port number that is corresponding to the MAC and the IP of the local OFC and is used when the OFS receives a Link Layer Discovery Protocol LLDP data packet sent by the OFC, and the method includes:

receiving the LLDP data packet, where the LLDP data packet includes a MAC, an IP, and a role sub-field of a sender, where the role sub-field is used to identify a sender type; and creating a controller list entry or updating the controller list entry when it is determined, by using the role sub-field, that a sender type of the received LLDP data packet is OFC, where the created controller list entry or the updated controller list entry includes a MAC and an IP of the local OFC that are carried in the LLDP data packet, and a port in_port through which the LLDP data packet is received; and the method further includes:

acquiring a first-time TCP handshake packet used for establishing a TCP connection; checking, according to a destination MAC and a destination IP that are carried in the TCP handshake packet, whether a corresponding controller list entry exists in the controller list; and if yes, updating a flow entry according to the MAC, the IP, and the in_port in the corresponding controller list entry in the controller list, so that the OFS can forward, by using a flow table, a packet to be sent to an OFC to the OFC.

In a first possible implementation manner of the first aspect, the method further includes the following step:

broadcasting the LLDP data packet whose sender type is OFC, so that another OFS can also execute the step of receiving the LLDP data packet, where the LLDP data packet includes a MAC, an IP, and a role sub-field of a sender, where the role sub-field is used to identify a sender type; and the step of creating a controller list entry or updating the controller list entry when it is determined, by using the role sub-field, that a sender type of the received LLDP data packet is OFC, where the created controller list entry or the updated controller list entry includes a MAC and an IP of the local OFC that are carried in the LLDP data packet, and a port in_port through which the LLDP data packet is received.

In a second possible implementation manner of the first aspect, the role sub-field is located in a tag-length-value TLV field in the LLDP data packet.

In a third possible implementation manner of the first aspect, the OFS includes a hardware module and a software module;

the receiving the LLDP data packet is specifically: receiving, by the hardware module of the OFS, the LLDP data packet, querying the flow table according to the received LLDP data packet, generating an LLDP-type packet_in message, and sending the LLDP-type packet_in message to the software module;

a process of obtaining the role sub-field is as follows:

receiving, by the software module of the OFS, a packet_in message sent by the hardware module, and parsing the packet_in message to determine whether the packet_in message is the LLDP-type packet_in message; and when it is determined that the packet_in message is the LLDP-type packet_in message, obtaining, by the software module of the OFS, the LLDP data packet by parsing the LLDP-type packet_in message, and obtaining the role sub-field by parsing a TLV field in the LLDP data packet; and the creating a controller list entry or updating the controller list entry specifically includes:

obtaining, by the software module of the OFS, the MAC and the IP of the sender by parsing the TLV field in the LLDP data packet, and obtaining, by parsing the LLDP-type packet_in message, the port in_port through which the OFS receives the LLDP data packet;

querying, by the software module of the OFS, the controller list to determine whether a controller list entry that matches the MAC and the IP that are obtained by means of parsing exists; and if not, creating a controller list entry to record the MAC, the IP, and the in_port that are obtained by means of parsing, setting a predefined aging time, and then using a packet_out message to FLOOD the LLDP data packet; or if yes, determining, by the software module of the OFS, whether an in_port in the controller list entry that matches the MAC and the IP that are obtained by means of parsing is the same as the in_port obtained by means of parsing; and if the same, resetting an aging time corresponding to the controller list entry to the predefined aging time, and then using a packet_out message to FLOOD the LLDP data packet; or if different, further determining, by the software module of the OFS, whether the aging time corresponding to the controller list entry arrives; and if yes, changing the in_port in the controller list entry to the in_port obtained by means of parsing, and then using a packet_out message to FLOOD the LLDP data packet; or if not, discarding, by the software module of the OFS, the LLDP data packet.

In a fourth possible implementation manner of the first aspect, the OFS includes a hardware module and a software module; and the acquiring a first-time TCP handshake packet used for establishing a TCP connection; checking, according to a destination MAC and a destination IP that are carried in the TCP handshake packet, whether a corresponding controller list entry exists in the controller list; and if yes, updating a flow entry according to the MAC, the IP, and the in_port in the corresponding controller list entry in the controller list, so that the OFS can forward, by using a flow table, a packet to be sent to an OFC to the OFC specifically includes:

receiving, by the hardware module of the OFS, the first-time TCP handshake packet used for establishing a TCP connection; parsing the first-time TCP handshake packet to obtain the destination MAC and the destination IP; querying the flow table according to the destination MAC and the destination IP that are obtained by means of parsing; generating a TCP-type packet_in message; and sending the TCP-type packet_in message to the software module;

receiving, by the software module of the OFS, a packet_in message sent by the hardware module, and parsing the packet_in message to determine whether the packet_in message is the TCP-type packet_in message;

when it is determined that the packet_in message is the TCP-type packet_in message, obtaining, by the software module of the OFS, the first-time TCP handshake packet by parsing the TCP-type packet_in message, and obtaining a source MAC, a source IP, the destination MAC, and the destination IP by parsing the first-time TCP handshake packet;

querying, by the software module of the OFS according to the destination MAC and the destination IP that are obtained by means of parsing, the controller list to determine whether a controller list entry that matches the destination MAC and the destination IP that are obtained by means of parsing exists, and if yes, generating a first flow entry and a second flow entry and sending the first flow entry and the second flow entry to the hardware module of the OFS, where the first flow entry records that: a source MAC is the source MAC obtained by means of parsing, a source IP is the source IP obtained by means of parsing, a destination MAC is the destination MAC obtained by means of parsing, a destination IP is the destination IP obtained by means of parsing, and a forwarding port is the in_port in the controller list entry that matches the destination MAC and the destination IP that are obtained by means of parsing; and the second flow entry records that: a source MAC is the destination MAC obtained by means of parsing, a source IP is the destination IP obtained by means of parsing, a destination MAC is the source MAC obtained by means of parsing, a destination IP is the source IP obtained by means of parsing, and a forwarding port is the in_port field in the TCP-type packet_in message; and receiving, by the hardware module of the OFS, the first flow entry and the second flow entry, and adding the first flow entry and the second flow entry to the flow table.

In a fifth possible implementation manner of the first aspect, when the controller list entry that matches the destination MAC and the destination IP that are obtained by means of parsing exists in the controller list, the method further includes the following steps:

generating, by the software module of the OFS, a packet-out message, and sending the packet-out message to the hardware module of the OFS, where an action action field in the packet-out message points to the flow table; and parsing, by the hardware module of the OFS, the packet-out message to obtain the first-time TCP handshake packet in the packet-out message, parsing the first-time TCP handshake packet to obtain the destination MAC and the destination IP, querying, according to the destination MAC and the destination IP that are obtained by means of parsing, the flow table to find a flow entry that matches the destination MAC and the destination IP that are obtained by means of parsing, and forwarding the first-time TCP handshake packet according to a forwarding port in the flow entry.

In a sixth possible implementation manner of the first aspect, when the entry that matches the destination MAC and the destination IP that are obtained by means of parsing does not exist in the controller list, the method further includes the following step:

sending, by the software module of the OFS, the TCP-type packet_in message through a management port of the OFS.

In a seventh possible implementation manner of the first aspect, the OFS adds a first initial flow entry to the flow table, where a destination address of the first initial flow entry is an LLDP protocol multicast address, a protocol type is LLDP protocol type coding, a forwarding port points to an OFC, a data packet length is a length of a full packet, and a priority is the lowest.

In an eighth possible implementation manner of the first aspect, the OFS adds a second initial flow entry to the flow table, where a destination address of the second initial flow entry is a local address, a protocol type is TCP protocol type coding, a forwarding port points to a management port of the OFS, a data packet length is a length of a full packet, and a priority is the lowest.

In a ninth possible implementation manner of the first aspect, the OFS further includes a neighbor list, where the neighbor list includes one or more neighbor list entries, and the neighbor list entry includes a MAC and an IP of another OFS, and a port number that is corresponding to the MAC and the IP of the another OFS and is used when the OFS receives an LLDP data packet sent by the another OFS; and when it is determined, by using the role sub-field, that a sender type of the received LLDP data packet is OFS, the method further includes the following steps:

obtaining, by a software module of the OFS, the MAC and the IP of the sender by parsing a TLV field in the LLDP data packet, and obtaining, by parsing an LLDP-type packet_in message, a port in_port through which the OFS receives the LLDP data packet;

querying, by the software module of the OFS, the neighbor list to determine whether a neighbor list entry that matches the MAC and the IP that are obtained by means of parsing exists; and if not, creating a neighbor list entry in the neighbor list to record the MAC, the IP, and the in_port that are obtained by means of parsing, and then using a packet_out message to FLOOD the LLDP data packet; or if yes, determining whether an in_port corresponding to the neighbor list entry that matches the MAC and the IP that are obtained by means of parsing is the same as the in_port obtained by means of parsing; and if the same, using a packet_out message to FLOOD the LLDP data packet; or if different, changing the in_port corresponding to the neighbor list entry to the in_port obtained by means of parsing, and then discarding the LLDP data packet.

In a tenth possible implementation manner of the first aspect, the OFS sends the neighbor list to an OFC, so that the OFC establishes a global network topology according to the neighbor list; and when the neighbor list changes, the OFS sends the changed neighbor list to the OFC, so that the OFC updates the global network topology according to the changed neighbor list.

In an eleventh possible implementation manner of the first aspect, the packets to be sent to the OFC include both a third-time TCP handshake packet and a data packet to be sent by another OFS to the OFC.

According to a second aspect, an OFS is provided, including:

a controller list storage unit, configured to store one or more controller list entries, where the controller list entry includes a MAC and an IP of a local OpenFlow controller OFC, and a port number that is corresponding to the MAC and the IP of the local OFC and is used when the OFS receives a Link Layer Discovery Protocol LLDP data packet sent by the OFC;

a data packet receiving unit, configured to receive the LLDP data packet, where the LLDP data packet includes a MAC, an IP, and a role sub-field of a sender, where the role sub-field is used to identify a sender type; and a data packet processing unit, configured to create a controller list entry or update the controller list entry when it is determined, by using the role sub-field, that a sender type of the received LLDP data packet is OFC, where the created controller list entry or the updated controller list entry includes a MAC and an IP of the local OFC that are carried in the LLDP data packet, and a port in_port through which the LLDP data packet is received; and a handshake packet unit, configured to: acquire a first-time TCP handshake packet used for establishing a TCP connection; check, according to a destination MAC and a destination IP that are carried in the TCP handshake packet, whether a corresponding controller list entry exists in the controller list; and if yes, update a flow entry according to the MAC, the IP, and the in_port in the corresponding controller list entry in the controller list, so that the OFS can forward, by using a flow table, a packet to be sent to an OFC to the OFC.

In a first possible implementation manner of the second aspect, the OFS further includes:

a data packet broadcasting unit, configured to broadcast the LLDP data packet whose sender type is OFC, so that another OFS can also receive the LLDP data packet, where the LLDP data packet includes the MAC, the IP, and the role sub-field of the sender, where the role sub-field is used to identify the sender type; and create the controller list entry or update the controller list entry when it is determined, by using the role sub-field, that the sender type of the received LLDP data packet is OFC, where the created controller list entry or the updated controller list entry includes the MAC and the IP of the local OFC that are carried in the LLDP data packet, and the port in_port through which the LLDP data packet is received.

In a second possible implementation manner of the second aspect, the role sub-field is located in a tag-length-value TLV field in the LLDP data packet.

In a third possible implementation manner of the second aspect, the data packet receiving unit is specifically configured to: receive the LLDP data packet, query the flow table according to the received LLDP data packet, generate an LLDP-type packet_in message, and send the LLDP-type packet_in message to a data path; and the data packet processing unit is specifically configured to: acquire a packet_in message from the data path, and parse the packet_in message to determine whether the packet_in message is the LLDP-type packet_in message;

when the packet_in message is the LLDP-type packet_in message, obtain the LLDP data packet by parsing the LLDP-type packet_in message, and obtain the role sub-field by parsing a TLV field in the LLDP data packet;

obtain the MAC and the IP of the sender by parsing the TLV field in the LLDP data packet, and obtain, by parsing the LLDP-type packet_in message, the port in_port through which the OFS receives the LLDP data packet; and query the controller list to determine whether a controller list entry that matches the MAC and the IP that are obtained by means of parsing exists; and if not, create a controller list entry to record the MAC, the IP, and the in_port that are obtained by means of parsing, set a predefined aging time, and then use a packet_out message to FLOOD the LLDP data packet; or if yes, determine whether the in_port in the controller list entry that matches the MAC and the IP that are obtained by means of parsing is the same as the in_port obtained by means of parsing; and if the same, reset an aging time corresponding to the controller list entry to the predefined aging time, and then use a packet_out message to FLOOD the LLDP data packet; or if different, further determine whether the aging time corresponding to the controller list entry arrives; and if yes, change the in_port in the controller list entry to the in_port obtained by means of parsing, and then use a packet_out message to FLOOD the LLDP data packet; or if not, discard the LLDP data packet.

In a fourth possible implementation manner of the second aspect, the handshake packet unit includes a first handshake packet module and a second handshake packet module, where the first handshake packet module is configured to: receive the first-time TCP handshake packet used for establishing a TCP connection, parse the first-time TCP handshake packet to obtain the destination MAC and the destination IP, query the flow table according to the destination MAC and the destination IP that are obtained by means of parsing, generate a TCP-type packet_in message, and send the TCP-type packet_in message to a data path; and the second handshake packet module is configured to: acquire a packet_in message from the data path, and parse the packet_in message to determine whether the packet_in message is the TCP-type packet_in message;

when the packet_in message is the TCP-type packet_in message, obtain the first-time TCP handshake packet by parsing the TCP-type packet_in message, and obtain a source MAC, a source IP, the destination MAC, and the destination IP by parsing the first-time TCP handshake packet; and query, according to the destination MAC and the destination IP that are obtained by means of parsing, the controller list to determine whether a controller list entry that matches the destination MAC and the destination IP that are obtained by means of parsing exists, and if yes, generate a first flow entry and a second flow entry and send the first flow entry and the second flow entry to the first handshake packet module, where the first flow entry records that: a source MAC is the source MAC obtained by means of parsing, a source IP is the source IP obtained by means of parsing, a destination MAC is the destination MAC obtained by means of parsing, a destination IP is the destination IP obtained by means of parsing, and a forwarding port is the in_port in the controller list entry that matches the destination MAC and the destination IP that are obtained by means of parsing; and the second flow entry records that: a source MAC is the destination MAC obtained by means of parsing, a source IP is the destination IP obtained by means of parsing, a destination MAC is the source MAC obtained by means of parsing, a destination IP is the source IP obtained by means of parsing, and a forwarding port is an in_port field in the TCP-type packet_in message; and the first handshake packet module is further configured to: receive the first flow entry and the second flow entry, and add the first flow entry and the second flow entry to the flow table.

In a fifth possible implementation manner of the second aspect, the second handshake packet module is further configured to: when the controller list entry that matches the destination MAC and the destination IP that are obtained by means of parsing exists in the controller list, generate a packet-out message, and send the packet-out message to the first handshake packet module, where an action action field in the packet-out message points to the flow table; and the first handshake packet module is further configured to: parse the packet-out message to obtain the first-time TCP handshake packet in the packet-out message, parse the first-time TCP handshake packet to obtain the destination MAC and the destination IP, query, according to the destination MAC and the destination IP that are obtained by means of parsing, the flow table to find a flow entry that matches the destination MAC and the destination IP that are obtained by means of parsing, and forward the first-time TCP handshake packet according to a forwarding port in the flow entry.

In a sixth possible implementation manner of the second aspect, the second handshake packet module is further configured to: when the entry that matches the destination MAC and the destination IP that are obtained by means of parsing does not exist in the controller list, send the TCP-type packet_in message through a management port of the OFS.

In a seventh possible implementation manner of the second aspect, the OFS further includes:

a first flow entry unit, configured to add a first initial flow entry to the flow table, where a destination address of the first initial flow entry is an LLDP protocol multicast address, a protocol type is LLDP protocol type coding, a forwarding port points to an OFC, a data packet length is a length of a full packet, and a priority is the lowest.

In an eighth possible implementation manner of the second aspect, the OFS further includes:

a second flow entry unit, configured to add a second initial flow entry to the flow table, where a destination address of the second initial flow entry is a local address, a protocol type is TCP protocol type coding, a forwarding port points to a management port of the OFS, a data packet length is a length of a full packet, and a priority is the lowest.

In a ninth possible implementation manner of the second aspect, the OFS further includes:

a neighbor list storage unit, configured to include one or more neighbor list entries, where the neighbor list entry includes a MAC and an IP of another OFS, and a port number that is corresponding to the MAC and the IP of the another OFS and is used when the OFS receives an LLDP data packet sent by the another OFS; and the data packet processing unit is further configured to: when it is determined, by using the role sub-field, that a sender type of the received LLDP data packet is OFS, obtain the MAC and the IP of the sender by parsing a TLV field in the LLDP data packet, and obtain, by parsing an LLDP-type packet_in message, a port in_port through which the OFS receives the LLDP data packet; and query the neighbor list to determine whether a neighbor list entry that matches the MAC and the IP that are obtained by means of parsing exists; and if not, create a neighbor list entry in the neighbor list to record the MAC, the IP, and the in_port that are obtained by means of parsing, and then use a packet_out message to FLOOD the LLDP data packet; or if yes, determine whether an in_port corresponding to the neighbor list entry that matches the MAC and the IP that are obtained by means of parsing is the same as the in_port obtained by means of parsing; and if the same, use a packet_out message to FLOOD the LLDP data packet; or if different, change the in_port corresponding to the neighbor list entry to the in_port obtained by means of parsing, and then discard the LLDP data packet.

In a tenth possible implementation manner of the second aspect, the OFS further includes:

a neighbor list sending unit, configured to: send the neighbor list to an OFC, so that the OFC establishes a global network topology according to the neighbor list; and when the neighbor list changes, send the changed neighbor list to the OFC, so that the OFC updates the global network topology according to the changed neighbor list.

In an eleventh possible implementation manner of the second aspect, the packets to be sent to the OFC include both a third-time TCP handshake packet and a data packet to be sent by another OFS to the OFC.

(3) Beneficial Effects

According to the OFS in-band communication method and the OFS according to the present invention, the method includes: receiving an LLDP data packet, where the LLDP data packet includes a MAC, an IP, and a role sub-field of a sender, where the role sub-field is used to identify a sender type; creating a controller list entry or updating a controller list entry when it is determined, by using the role sub-field, that a sender type of the received LLDP data packet is OFC, where the created controller list entry or the updated controller list entry includes a MAC and an IP of a local OFC that are carried in the LLDP data packet, and a port in_port through which the LLDP data packet is received; acquiring a first-time TCP handshake packet used for establishing a TCP connection, and checking, according to a destination MAC and a destination IP that are carried in the TCP handshake packet, whether a corresponding controller list entry exists in a controller list; and if yes, updating a flow entry according to the MAC, the IP, and the in_port in the corresponding controller list entry in the controller list, so that the OFS can forward, by using a flow table, a packet to be sent to an OFC to the OFC. By using the OFS in-band communication method and the OFS in the present invention, control plane signaling and forwarding plane data are carried in a same OpenFlow network, and network communication can be implemented by maintaining only one network management system, which reduces networking costs.

BRIEF DESCRIPTION OF DRAWINGS

To describe the technical solutions in the embodiments of the present invention or in the prior art more clearly, the following briefly introduces the accompanying drawings required for describing the embodiments or the prior art.

FIG. 2*b* is a detailed flowchart of step 220 of the OFS in-band communication method according to Embodiment 1 of the present invention;

DESCRIPTION OF EMBODIMENTS

The following further describes specific implementation manners of the present invention in detail with reference to accompanying drawings and embodiments. The following embodiments are used for illustrating the present invention, but not limiting the scope of the present invention.

The present invention aims to implement an OFS in-band communication method by using the existing OpenFlow (v1.2) specification and the LLDP (Link Layer Discovery Protocol). In the method, each OFS does not distinguish content (which is control information or data information) of a data packet forwarded by the OFS, control information of each OFS is forwarded in a network as data information of another OFS, and only when a destination address of a data packet points to the OFS itself, the OFS parses the data packet to obtain control information in the data packet. Therefore, the foregoing method is based on one physical network, and in-band communication can be implemented by maintaining only one network management system, which effectively reduces implementation costs.

The following describes in detail the OFS in-band communication method and the OFS in the present invention with reference to specific embodiments.

Embodiment 1

Figure 1:
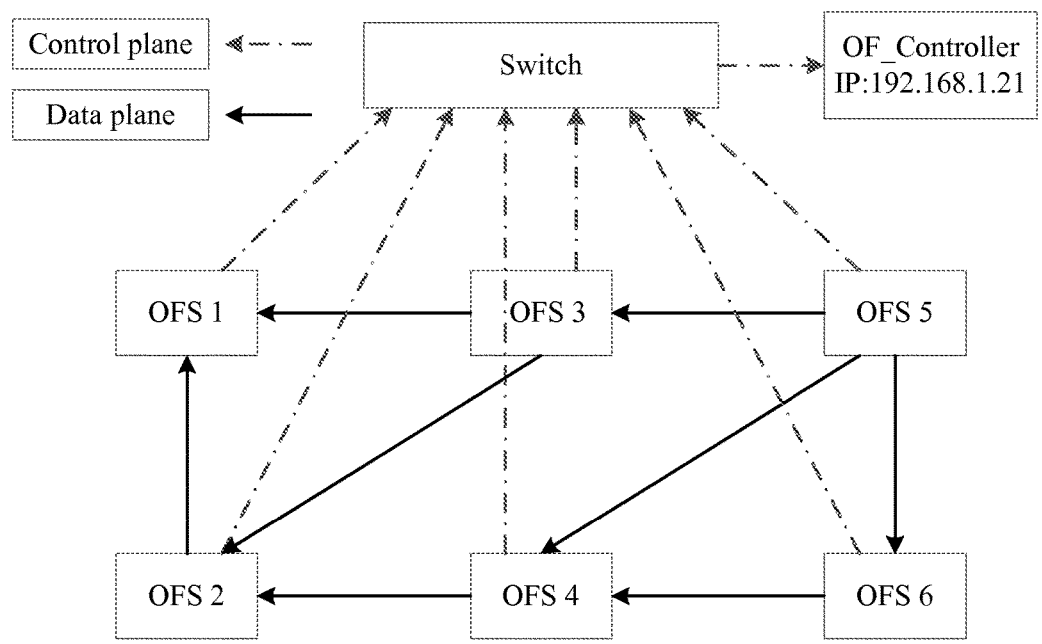
FIG. 1 is a networking diagram of an existing out-of-band connection mode.
Figure 2A:
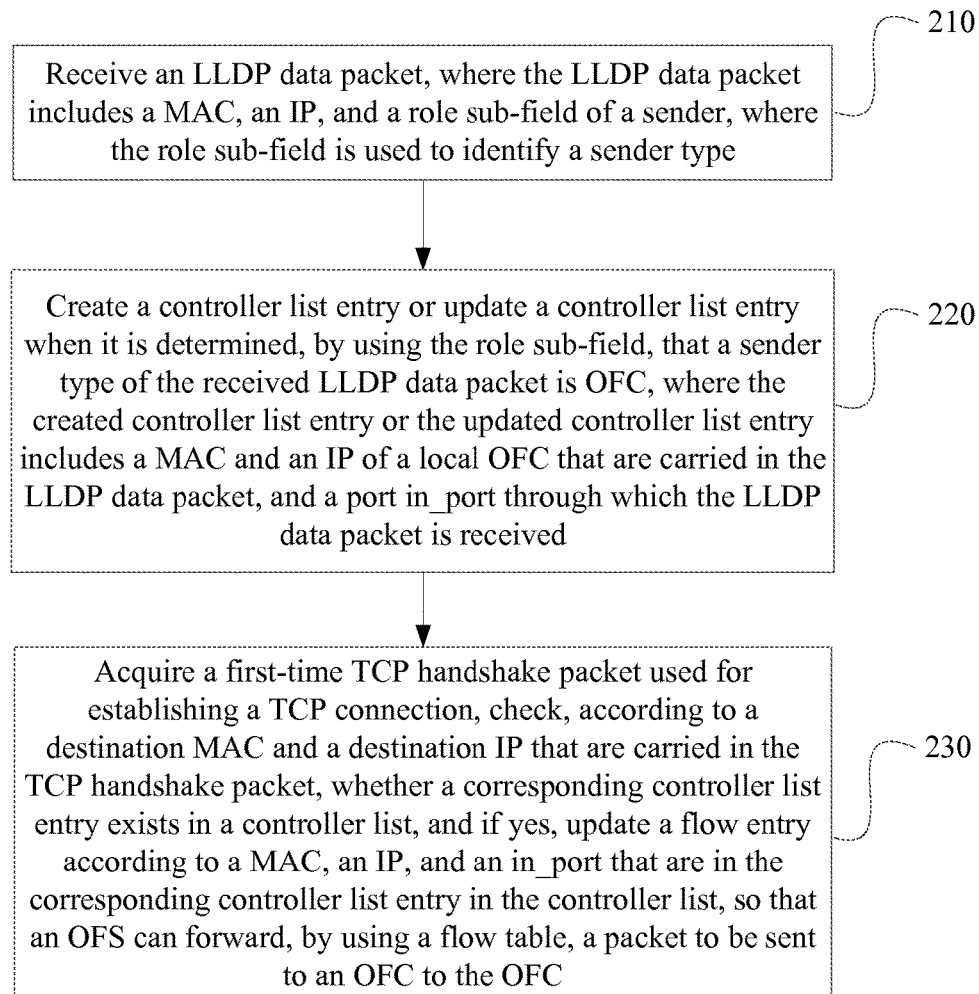
FIG. 2*a* is a flowchart of an OFS in-band communication method according to Embodiment 1 of the present invention.

FIG. 2*a* is a flowchart of an OFS in-band communication method according to Embodiment 1 of the present invention. As shown in FIG. 2*a*, the method is executed by an OFS, and the method includes the following steps:

210. Receive an LLDP data packet, where the LLDP data packet includes a MAC, an IP, and a role sub-field of a sender, where the role sub-field is used to identify a sender type.

Specifically, the LLDP data packet may be sent by an OFC, or may be sent by another OFS. To ensure that a receiver can identify a sender type, the role sub-field used to identify a sender type is included in the LLDP data packet.

Preferably, the role sub-field is located in a tag-length-value TLV field in the LLDP data packet. The following Table 3 is an example of a field in the LLDP data packet. The LLDP data packet includes: an Eth_dst field, an Eth_src field, an Eth_type field, and a tag-length-value TLV (one of BER coding in the ASN1 standard, and Tag, Length, and Value in full spelling) field; the TLV field includes: a MAC (Media Access Control) address sub-field, an IP (Internet Protocol) address sub-field, a role sub-field, and a port sub-field. The first row in Table 3 indicates an LLDP data packet sent by an OFC, a role sub-field of the LLDP data packet corresponds to the OFC, and a port sub-field of the LLDP data packet corresponds to a listening port of the OFC; the second row in Table 3 indicates an LLDP data packet sent by an OFS, a role sub-field of the LLDP data packet corresponds to the OFS, and a port sub-field of the LLDP data packet corresponds to a physical port number of the OFS.

TABLE 3

Example of a field in an LLDP data packet

| Eth_dst | Eth_src | Eth_type | TLV |
| --- | --- | --- | --- |
| 01:80:c2:00:00:0e | Self | 0x88CC | MAC/IP/Role C/Listening port |
| 01:80:c2:00:00:0e | Self | 0x88CC | MAC/IP/Role S/Physical port number |

The OFS includes a hardware module and a software module, where the hardware module (based on some dedicated hardware customized components, such as an FPGA and an ASIC) is configured to: perform flow table matching after the OFS receives a packet, that is, perform matching on a flow table by using the hardware module after the packet is received; if the packet matches the flow table, perform forwarding according to an instruction in a matching entry; and if the packet does not match the flow table, send the packet to the software module (based on a CPU). The receiving an LLDP data packet is specifically: receiving, by the hardware module of the OFS, the LLDP data packet, querying the flow table according to the received LLDP data packet, and after the matching fails, generating a packet_in message and sending the packet_in message to the software module.

220. Create a controller list entry or update a controller list entry when it is determined, by using the role sub-field, that a sender type of the received LLDP data packet is OFC, where the created controller list entry or the updated controller list entry includes a MAC and an IP of a local OFC that are carried in the LLDP data packet, and a port in_port through which the LLDP data packet is received.

Specifically, the OFS includes a controller list, the controller list is used to store one or more controller list entries, and the controller list entry includes a MAC and an IP of the local OpenFlow controller OFC, and a port number that is corresponding to the MAC and the IP of the local OFC and is used when the OFS receives a Link Layer Discovery Protocol LLDP data packet sent by the OFC. The OFS creates a controller list entry or updates the controller list entry according to the received LLDP data packet, and further updates a flow entry according to the controller list entry, so as to establish a connection between the OFS and the OFC.

FIG. 2b is a detailed flowchart of step 220 of the OFS in-band communication method according to Embodiment 1 of the present invention, and step 220 specifically includes the following steps:

221. A software module of an OFS receives a packet_in message sent by a hardware module (the hardware module generates a packet_in message when failing to query a flow table), and parses the packet_in message to determine whether the packet_in message is an LLDP-type packet_in message.

222. When the packet_in message is the LLDP-type packet_in message, the software module of the OFS obtains the LLDP data packet by parsing the LLDP-type packet_in message, and obtains the role sub-field by parsing a TLV field in the LLDP data packet.

223. When it is determined, according to the role sub-field, that the sender type of the received LLDP data packet is OFC, the software module of the OFS obtains the MAC and the IP of the sender by parsing the TLV field in the LLDP data packet, and obtains, by parsing the LLDP-type packet_in message, the port in_port through which the OFS receives the LLDP data packet.

224. The software module of the OFS queries a controller list to determine whether a controller list entry that matches the MAC and the IP that are obtained by means of parsing exists; and if not, creates a controller list entry to record the MAC, the IP, and the in_port that are obtained by means of parsing, sets a predefined aging time, and then uses a packet_out message to FLOOD (FLOOD means to forward the LLDP data packet through all available ports except an ingress port) the LLDP packet; or if yes, performs step 225.

225. The software module of the OFS determines whether in_port in the controller list entry that matches the MAC and the IP that are obtained by means of parsing is the same as the in_port obtained by means of parsing; and if the same, resets an aging time corresponding to the controller list entry to the predefined aging time, and then uses a packet_out message to FLOOD the LLDP data packet; or if different, performs step 226.

226. The software module of the OFS further determines whether the aging time corresponding to the controller list entry arrives; and if yes, changes the in_port in the controller list entry to the in_port obtained by means of parsing, and then uses a packet_out message to FLOOD the LLDP data packet; or if not, the software module of the OFS discards the LLDP data packet.

The method further includes the following step:

230. Acquire a first-time TCP handshake packet used for establishing a TCP connection; check, according to a destination MAC and a destination IP that are carried in the TCP handshake packet, whether a corresponding controller list entry exists in the controller list; and if yes, update a flow entry according to the MAC, the IP, and the in_port in the corresponding controller list entry in the controller list, so that the OFS can forward, by using a flow table, a packet to be sent to an OFC to the OFC.

After the flow table is created, the OFS completes TCP handshake communication with the OFC based on the flow table, and establishes a TCP connection with the OFC. The packet to be sent to the OFC includes a third-time TCP handshake packet, and also includes a data packet to be sent by another OFS to the OFC.

Figure 2C:
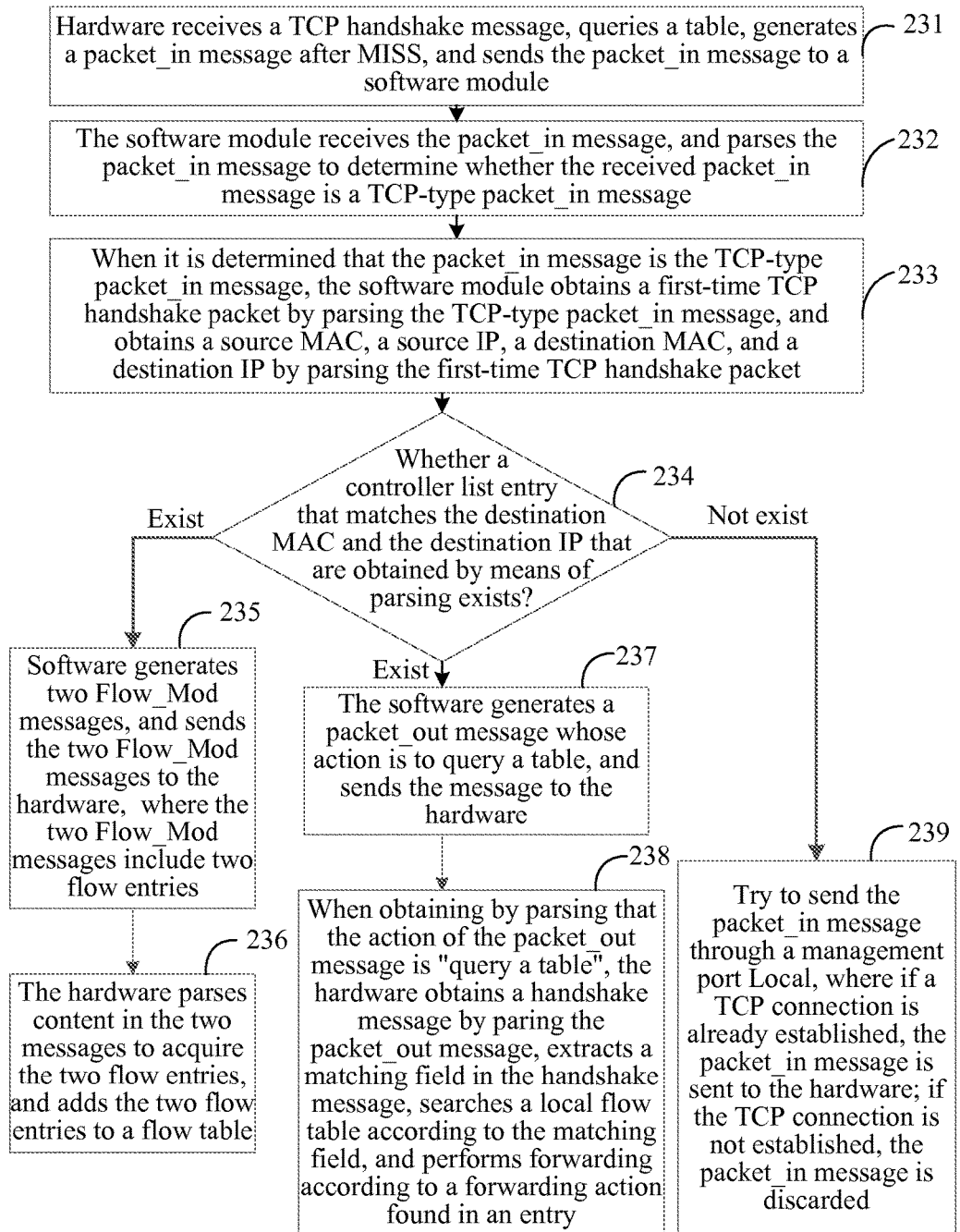
FIG. 2*c* is a detailed flowchart of step 230 of the OFS in-band communication method according to Embodiment 1 of the present invention.

FIG. 2c is a detailed flowchart of step 230 of the OFS in-band communication method according to Embodiment 1 of the present invention, and step 230 specifically includes the following steps:

231. A hardware module of the OFS receives the first-time TCP handshake packet used for establishing a TCP connection, parses the first-time handshake packet to obtain the destination MAC and the destination IP, queries the flow table according to the destination MAC and the destination IP that are obtained by means of parsing, generates a TCP-type packet_in message, and sends the packet_in of a TCP type to the software module.

232. A software module of the OFS receives a packet_in message sent by the hardware module, and parses the packet_in message to determine whether the packet_in message is the TCP-type packet_in message.

233. When it is determined that the packet_in message is the TCP-type packet_in message, the software module of the OFS obtains the first-time TCP handshake packet by parsing the TCP-type packet_in message, and obtains a source MAC, a source IP, the destination MAC, and the destination IP by parsing the first-time TCP handshake packet.

234. The software module of the OFS queries, according to the destination MAC and the destination IP that are obtained by means of parsing, the controller list to determine whether a controller list entry that matches the destination MAC and the destination IP that are obtained by means of parsing exists; and if yes, performs steps 235 and 237; or when it does not exist, performs step 239.

235. Generate a first flow entry and a second flow entry, and send the first flow entry and the second flow entry to the hardware module of the OFS, where the first flow entry records that: a source MAC is the source MAC obtained by means of parsing, a source IP is the source IP obtained by means of parsing, a destination MAC is the destination MAC obtained by means of parsing, a destination IP is the destination IP obtained by means of parsing, and a forwarding port is the in_port in the controller list entry that matches the destination MAC and the destination IP that are obtained by means of parsing; and the second flow entry records that: a source MAC is the destination MAC obtained by means of parsing, a source IP is the destination IP obtained by means of parsing, a destination MAC is the source MAC obtained by means of parsing, a destination IP is the source IP obtained by means of parsing, and a forwarding port is an in_port field in the TCP-type packet_in message.

236. The hardware module of the OFS receives the first flow entry and the second flow entry, and adds the first flow entry and the second flow entry to the flow table.

In addition, when the controller list entry that matches the destination MAC and the destination IP that are obtained by means of parsing exists in the controller list, the following steps are further included:

237. The software module of the OFS generates a packet-out message and sends the packet-out message to the hardware module of the OFS, where an action field in the packet-out message points to the flow table.

238. The hardware module of the OFS parses the packet-out message to obtain the first-time TCP handshake packet_in the packet-out message, parses the first-time TCP handshake packet to obtain the destination MAC and the destination IP, queries, according to the destination MAC and the destination IP that are obtained by means of parsing, the flow table to find a flow entry that matches the destination MAC and the destination IP that are obtained by means of parsing, and forwards the first-time TCP handshake packet according to a forwarding port in the flow entry.

When the entry that matches the destination MAC and the destination IP that are obtained by means of parsing does not exist in the controller list, the following step is further included:

239. The software module of the OFS sends the TCP-type packet_in message through a management port of the OFS.

Figure 2D:
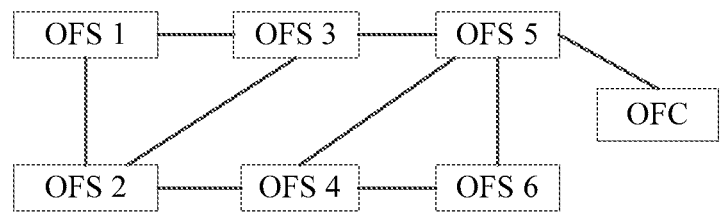
FIG. 2*d* is a networking diagram of an in-band connection mode that implements the OFS in-band communication method according to Embodiment 1 of the present invention.

FIG. 2d is a networking diagram of an in-band connection mode that implements the OFS in-band communication method according to an embodiment of the present invention. As shown in FIG. 2d, in this embodiment of the present invention, each OFS does not distinguish content (which is control information or data information) of a data packet forwarded by the OFS, control information of each OFS is forwarded in a network as data information of another OFS, and only when a destination address of a data packet points to the OFS itself, the OFS parses the data packet to obtain control information in the data packet. Therefore, the foregoing method is based on one physical network, and in-band communication can be implemented by maintaining only one network management system, which effectively reduces implementation costs. In addition, the OFS parses the LLDP packet from the OFC, so that autodiscovery of the OFC can be implemented by the OFS, and a configuration time of a switch is reduced.

Embodiment 2

Embodiment 2 is described based on Embodiment 1.

Optionally, before step 210, the method may further include:

adding, by the OFS, a first initial flow entry to the flow table, where a destination address of the first initial flow entry is an LLDP protocol multicast address, a protocol type is LLDP protocol type coding, a forwarding port points to an OFC, a data packet length is a length of a full packet, and a priority is the lowest; or adding, by the OFS, a second initial flow entry to the flow table, where a destination address of the second initial flow entry is a local address, a protocol type is TCP protocol type coding, a forwarding port points to a management port of the OFS, a data packet length is a length of a full packet, and a priority is the lowest.

Specifically, the following Table 1 is an example of the first initial flow entry, where 01:80:c2:00:00:0e indicates the multicast address of the LLDP protocol and is a MAC address, 0x88CC indicates the LLDP protocol type coding, Controller indicates the forwarding port that points to the OFC, and OFPR_NO_BUFFER indicates that the data packet length is the length of a full packet.

TABLE 1

Example of a first initial flow entry

| Eth_dst | Eth_type | Output | MAX_LEN | Priority |
|---|---|---|---|---|
| 01:80:c2:00:00:0e | 0x88CC (LLDP) | Controller | OFPR_NO_BUFFER | Lowest |

The following Table 2 is an example of the second initial flow entry, where the first Self indicates a MAC address that points locally, 0x0800 indicates the LLDP protocol type coding, the second Self indicates an IP address that points locally, LOCAL indicates that the forwarding port points to the management port of the OFS, and OFPR_NO_BUFFER indicates that the data packet length is the length of a full packet.

TABLE 2

Example of a second initial flow entry

| Eth_dst | Eth_type | IP_dst | Output | MAX_LEN | Priority |
|---|---|---|---|---|---|
| Self | 0x0800 | Self | LOCAL | OFPR_NO_BUFFER | Lowest |

After the first initial flow entry is set, the hardware module of the OFS receives the LLDP data packet, queries the flow table according to the received LLDP data packet, generates an LLDP-type packet_in message, and sends the LLDP-type packet_in message to the software module, thereby triggering the software module of the OFS to perform subsequent processing on the LLDP-type packet_in message.

After the second initial flow entry is set, the hardware module of the OFS receives the first-time TCP handshake packet used for establishing a TCP connection, parses the first-time TCP handshake packet to obtain the destination MAC and the destination IP, queries the flow table according to the destination MAC and the destination IP that are obtained by means of parsing, generates a TCP-type packet_in message, and sends the TCP-type packet_in message to the software module, thereby triggering the software module of the OFS to perform subsequent processing on the TCP-type packet_in message.

Optionally, in the method, when it is determined, by using the role sub-field, that a sender type of the received LLDP data packet is OFC, the method further includes:

broadcasting the LLDP data packet whose sender type is OFC, so that another OFS can also execute the step of receiving the LLDP data packet, where the LLDP data packet includes a MAC, an IP, and a role sub-field of a sender, where the role sub-field is used to identify a sender type; and the step of creating a controller list entry or updating a controller list entry when it is determined, by using the role sub-field, that a sender type of the received LLDP data packet is OFC, where the created controller list entry or the updated controller list entry includes a MAC and an IP of the local OFC that are carried in the LLDP data packet, and a port in_port through which the LLDP data packet is received.

Optionally, the OFS further includes a neighbor list, where the neighbor list includes one or more neighbor list entries, and the neighbor list entry includes a MAC and an IP of another OFS, and a port number that is corresponding to the MAC and the IP of the another OFS and is used when the OFS receives an LLDP data packet sent by the another OFS.

After step 210, the method further includes the following steps:

when it is determined, by using the role sub-field, that a sender type of the received LLDP data packet is OFS, obtaining, by a software module of the OFS, the MAC and the IP of the sender by parsing a TLV field in the LLDP data packet, and obtaining, by parsing an LLDP-type packet_in message, a port in_port through which the OFS receives the LLDP data packet;

querying, by the software module of the OFS, the neighbor list to determine whether a neighbor list entry that matches the MAC and the IP that are obtained by means of parsing exists; and if not, creating a neighbor list entry in the neighbor list to record the MAC, the IP, and the in_port that are obtained by means of parsing, and then using a packet_out message to FLOOD the LLDP data packet; or if yes, determining whether an in_port corresponding to the neighbor list entry that matches the MAC and the IP that are obtained by means of parsing is the same as the in_port obtained by means of parsing; and if the same, using a packet_out message to FLOOD the LLDP data packet; or if different, changing the in_port corresponding to the neighbor list entry to the in_port obtained by means of parsing, and then discarding the LLDP data packet.

In addition, after step 230, the method may further include:

sending, by the OFS, the neighbor list to an OFC, so that the OFC establishes a global network topology according to the neighbor list; and when the neighbor list changes, sending, by the OFS, the changed neighbor list to the OFC, so that the OFC updates the global network topology according to the changed neighbor list.

That is, after the TCP connection is established between the OFS and the OFC, each OFS actively sends a neighbor list to the OFC, and the global network topology may be obtained after the OFC summarizes the neighbor lists. In addition, when the neighbor list changes, the OFS sends the changed neighbor list to the OFC, and the OFC updates the global network topology according to the changed neighbor list.

In this embodiment, an OFS, instead of an OFC, completes discovery of a network topology, thereby greatly reducing time for discovering the network topology.

Embodiment 3

Figure 3:
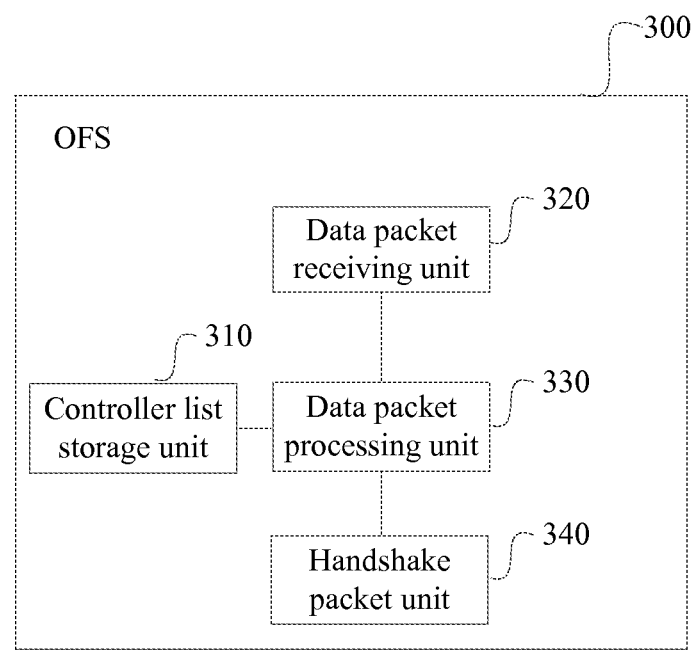
FIG. 3 is a schematic structural diagram of an internal module of an OFS according to Embodiment 3 of the present invention.

FIG. 3 is a schematic structural diagram of an internal module of an OFS 300 according to Embodiment 3 of the present invention. As shown in FIG. 3, the OFS 300 includes: a controller list storage unit 310, a data packet receiving unit 320, a data packet processing unit 330, and a handshake packet unit 340.

The controller list storage unit 310 is configured to store one or more controller list entries, where the controller list entry includes a MAC and an IP of a local OpenFlow controller OFC, and a port number that is corresponding to the MAC and the IP of the local OFC and is used when the OFS receives a Link Layer Discovery Protocol LLDP data packet sent by the OFC.

The data packet receiving unit 320 is configured to receive the LLDP data packet, where the LLDP data packet includes a MAC, an IP, and a role sub-field of a sender, where the role sub-field is used to identify a sender type.

The role sub-field is located in a tag-length-value TLV field in the LLDP data packet.

The data packet receiving unit 320 is specifically configured to: receive the LLDP data packet, query the flow table according to the received LLDP data packet, generate an LLDP-type packet_in message, and send the LLDP-type packet_in message to a data path.

The data packet processing unit 330 is configured to create a controller list entry or update the controller list entry when it is determined, by using the role sub-field, that a sender type of the received LLDP data packet is OFC, where the created controller list entry or the updated controller list entry includes a MAC and an IP of the local OFC that are carried in the LLDP data packet, and a port in_port through which the LLDP data packet is received.

The data packet processing unit 330 is specifically configured to: acquire a packet_in message from the data path, and parse the packet_in message to determine whether the packet_in message is the LLDP-type packet_in message;

when it is determined that the packet_in message is the LLDP-type packet_in message, obtain the LLDP data packet by parsing the LLDP-type packet_in message, obtain the role sub-field by parsing the TLV field in the LLDP data packet, obtain the MAC and the IP of the sender by parsing the TLV field in the LLDP data packet, and obtain, by parsing the LLDP-type packet_in message, the port in_port through which the OFS receives the LLDP data packet; and query the controller list to determine whether a controller list entry that matches the MAC and the IP that are obtained by means of parsing exists; and if not, create a controller list entry to record the MAC, the IP, and the in_port that are obtained by means of parsing, set a predefined aging time, and then use a packet_out message to FLOOD the LLDP data packet; or if yes, determine whether the in_port in the controller list entry that matches the MAC and the IP that are obtained by means of parsing is the same as the in_port obtained by means of parsing; and if the same, reset an aging time corresponding to the controller list entry to the predefined aging time, and then use a packet_out message to FLOOD the LLDP data packet; or if different, further determine whether the aging time corresponding to the controller list entry arrives; and if yes, change the in_port in the controller list entry to the in_port obtained by means of parsing, and then use a packet_out message to FLOOD the LLDP data packet; or if not, discard the LLDP data packet.

The handshake packet unit 340 is configured to: acquire a first-time TCP handshake packet used for establishing a TCP connection; check, according to a destination MAC and a destination IP that are carried in the TCP handshake packet, whether a corresponding controller list entry exists in the controller list; and if yes, update a flow entry according to the MAC, the IP, and the in_port in the corresponding controller list entry in the controller list, so that the OFS can forward, by using a flow table, a packet to be sent to an OFC to the OFC.

Figure 4:
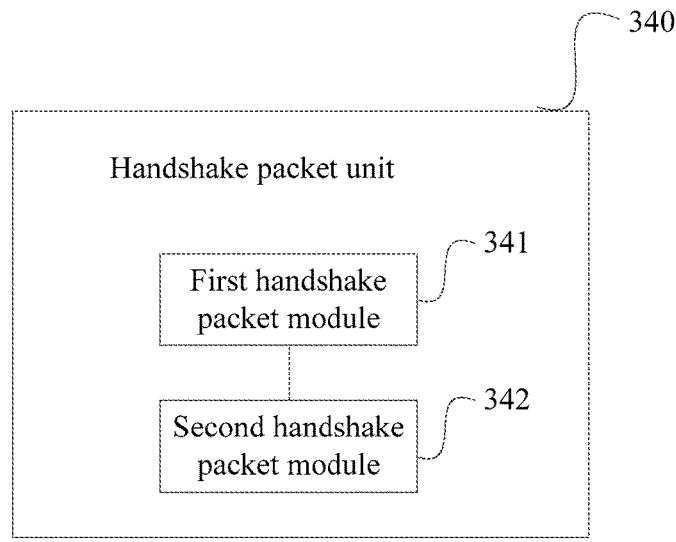
FIG. 4 is a schematic structural diagram of an internal module of a handshake packet unit according to Embodiment 3 of the present invention.

Referring to FIG. 4, the handshake packet unit 340 includes a first handshake packet module 341 and a second handshake packet module 342.

The first handshake packet module 341 is configured to: receive the first-time TCP handshake packet used for establishing a TCP connection, parse the first-time TCP handshake packet to obtain the destination MAC and the destination IP, query the flow table according to the destination MAC and the destination IP that are obtained by means of parsing, generate a TCP-type packet_in message, and send the TCP-type packet_in message to a data path.

The second handshake packet module 342 is configured to: acquire a packet_in message from the data path, and parse the packet_in message to determine whether the packet_in message is the TCP-type packet_in message;

when the packet_in message is the TCP-type packet_in message, obtain the first-time TCP handshake packet by parsing the TCP-type packet_in message, and obtain a source MAC, a source IP, the destination MAC, and the destination IP by parsing the first-time TCP handshake packet; and query, according to the destination MAC and the destination IP that are obtained by means of parsing, the controller list to determine whether a controller list entry that matches the destination MAC and the destination IP that are obtained by means of parsing exists, and if yes, generate a first flow entry and a second flow entry and send the first flow entry and the second flow entry to the first handshake packet module, where the first flow entry records that: a source MAC is the source MAC obtained by means of parsing, a source IP is the source IP obtained by means of parsing, a destination MAC is the destination MAC obtained by means of parsing, a destination IP is the destination IP obtained by means of parsing, and a forwarding port is the in_port in the controller list entry that matches the destination MAC and the destination IP that are obtained by means of parsing; and the second flow entry records that: a source MAC is the destination MAC obtained by means of parsing, a source IP is the destination IP obtained by means of parsing, a destination MAC is the source MAC obtained by means of parsing, a destination IP is the source IP obtained by means of parsing, and a forwarding port is an in_port field in the TCP-type packet_in message.

The first handshake packet module 341 is further configured to: receive the first flow entry and the second flow entry, and add the first flow entry and the second flow entry to the flow table.

The second handshake packet module 342 is further configured to: when the controller list entry that matches the destination MAC and the destination IP that are obtained by means of parsing exists in the controller list, generate a packet-out message, and send the packet-out message to the first handshake packet module, where an action action field in the packet-out message points to the flow table.

The first handshake packet module 341 is further configured to: parse the packet-out message to obtain the first-time TCP handshake packet_in the packet-out message, parse the first-time TCP handshake packet to obtain the destination MAC and the destination IP, query, according to the destination MAC and the destination IP that are obtained by means of parsing, the flow table to find a flow entry that matches the destination MAC and the destination IP that are obtained by means of parsing, and forward the first-time TCP handshake packet according to a forwarding port in the flow entry.

The second handshake packet module 342 is further configured to: when the entry that matches the destination MAC and the destination IP that are obtained by means of parsing does not exist in the controller list, send the TCP-type packet_in message through a management port of the OFS.

Embodiment 4

Figure 5:
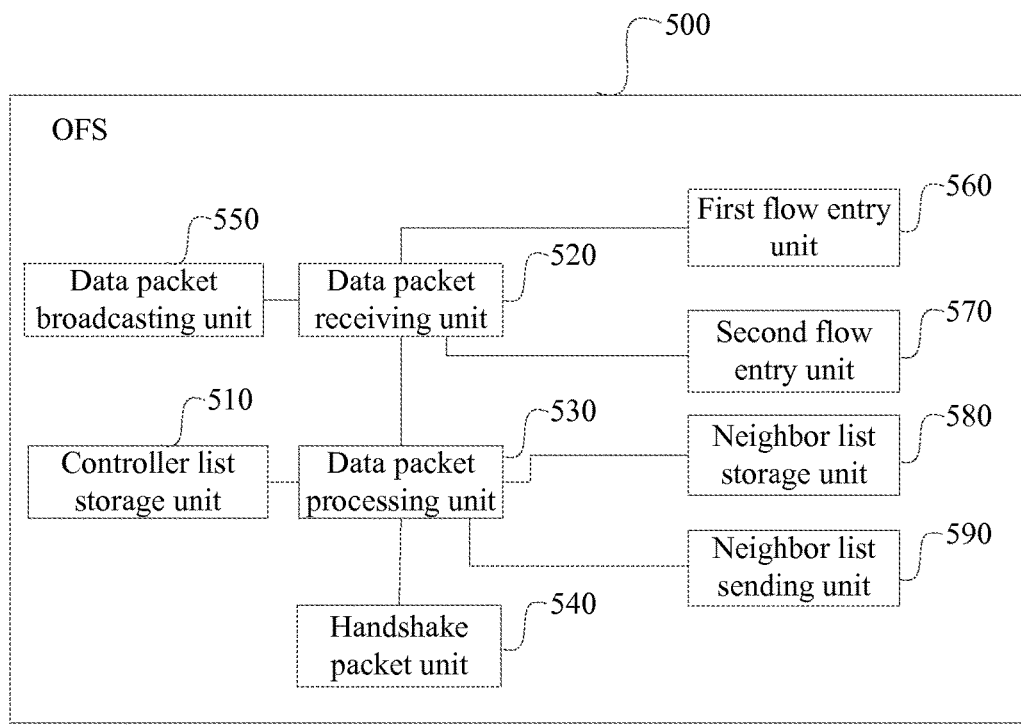
FIG. 5 is a schematic structural diagram of an internal module of an OFS according to Embodiment 4 of the present invention.

This embodiment is described based on Embodiment 3. FIG. 5 is a schematic structural diagram of an internal module of an OFS 500 according to Embodiment 4 of the present invention. As shown in FIG. 5, the OFS 500 in this embodiment not only includes a controller list storage unit 510, a data packet receiving unit 520, a data packet processing unit 530, and a handshake packet unit 540, but also includes a data packet broadcasting unit 550, a first flow entry unit 560, a second flow entry unit 570, a neighbor list storage unit 580, and a neighbor list sending unit 590.

The data packet broadcasting unit 550 is configured to broadcast an LLDP data packet whose sender type is OFC, so that another OFS can also receive the LLDP data packet, where the LLDP data packet includes a MAC, an IP, and a role sub-field of a sender, where the role sub-field is used to identify a sender type; and create a controller list entry or update a controller list entry when it is determined, by using the role sub-field, that a sender type of the received LLDP data packet is OFC, where the created controller list entry or the updated controller list entry includes a MAC and an IP of a local OFC that are carried in the LLDP data packet, and a port in_port through which the LLDP data packet is received.

The first flow entry unit 560 is configured to add a first initial flow entry to a flow table, where a destination address of the first initial flow entry is an LLDP protocol multicast address, a protocol type is LLDP protocol type coding, a forwarding port points to an OFC, a data packet length is a length of a full packet, and a priority is the lowest.

The second flow entry unit 570 is configured to add a second initial flow entry to a flow table, where a destination address of the second initial flow entry is a local address, a protocol type is TCP protocol type coding, a forwarding port points to a management port of the OFS, a data packet length is a length of a full packet, and a priority is the lowest.

The neighbor list storage unit 580 is configured to include one or more neighbor list entries, where the neighbor list entry includes a MAC and an IP of another OFS, and a port number that is corresponding to the MAC and the IP of the another OFS and is used when the OFS receives an LLDP data packet sent by the another OFS.

The data packet processing unit 530 is further configured to: when it is determined, by using the role sub-field, that a sender type of the received LLDP data packet is OFS, obtain a MAC and an IP of a sender by parsing a TLV field in the LLDP data packet, and obtain, by parsing an LLDP-type packet_in message, a port in_port through which the OFS receives the LLDP data packet;

query the neighbor list to determine whether a neighbor list entry that matches the MAC and the IP that are obtained by means of parsing exists; and if not, create a neighbor list entry in the neighbor list to record the MAC, the IP, and the in_port that are obtained by means of parsing, and then use a packet_out message to FLOOD the LLDP data packet; or if yes, determine whether an in_port corresponding to the neighbor list entry that matches the MAC and the IP that are obtained by means of parsing is the same as the in_port obtained by means of parsing; and if the same, use a packet_out message to FLOOD the LLDP data packet; or if different, change the in_port corresponding to the neighbor list entry to the in_port obtained by means of parsing, and then discard the LLDP data packet.

The neighbor list sending unit 590 is configured to: send the neighbor list to an OFC, so that the OFC establishes a global network topology according to the neighbor list; and when the neighbor list changes, send the changed neighbor list to the OFC, so that the OFC updates the global network topology according to the changed neighbor list.

Figure 6:
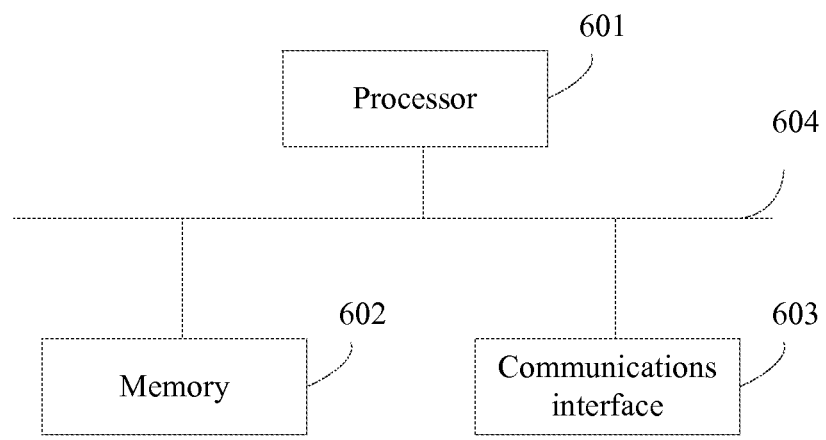
FIG. 6 is a schematic structural diagram of hardware of an OFS according to the present invention.

The OFS in this embodiment of the present invention may be implemented based on a computer system, and the method shown in FIG. 2a, FIG. 2b, and FIG. 2c may be implemented in the OFS that is based on the computer system. FIG. 6 shows an embodiment of an OFS that is implemented based on a computer system. In this embodiment, the OFS may include: a processor 601, a memory 602, and a communications interface 603.

The communications interface 603 is configured to communicate with an OFC or another OFS. Specifically, the communications interface 603 is configured to receive an LLDP data packet and a first-time TCP handshake packet; the memory 602 is configured to store a program instruction, a controller list, a flow table, and the like; the processor 601 is configured to: after the LLDP data packet is received, invoke the program instruction stored in the memory 602, so as to execute the following operations: creating a controller list entry or updating a controller list entry when it is determined, by using a role sub-field, that a sender type of the received LLDP data packet is OFC, where the created controller list entry or the updated controller list entry includes a MAC and an IP of a local OFC that are carried in the LLDP data packet, and a port in_port through which the LLDP data packet is received; and after the first-time TCP handshake packet used for establishing a TCP connection is received, invoke the program instruction stored in the memory 602, so as to execute the following operations: checking, according to a destination MAC and a destination IP that are carried in the TCP handshake packet, whether a corresponding controller list entry exists in the controller list, and if yes, updating a flow entry according to the MAC, the IP, and the in_port in the corresponding controller list entry in the controller list, so that the OFS can forward, by using the flow table, a packet to be sent to an OFC to the OFC.

The processor 601 may be a central processing unit (CPU), an application-specific integrated circuit (ASIC), or the like. In this embodiment, the OFS may include a bus 604. The processor 601, the memory 602, and the communications interface 603 may connect to each other and communicate with each other by using the bus 604. The memory 602 may include an entity, such as a random access memory (RAM), a read-only memory (ROM), a magnetic disk, or the like, which has a storage function.

The processor 601 may be further configured to execute steps described in method Embodiment 2, and details are not described herein again in this embodiment of the present invention.

According to the OFS in-band communication method and the OFS according to the present invention, the method includes: receiving an LLDP data packet, where the LLDP data packet includes a MAC, an IP, and a role sub-field of a sender, where the role sub-field is used to identify a sender type; creating a controller list entry or updating a controller list entry when it is determined, by using the role sub-field, that a sender type of the received LLDP data packet is OFC, where the created controller list entry or the updated controller list entry includes a MAC and an IP of a local OFC that are carried in the LLDP data packet, and a port in_port through which the LLDP data packet is received; acquiring a first-time TCP handshake packet used for establishing a TCP connection, and checking, according to a destination MAC and a destination IP that are carried in the TCP handshake packet, whether a corresponding controller list entry exists in a controller list; and if yes, updating a flow entry according to the MAC, the IP, and the in_port in the corresponding controller list entry in the controller list, so that the OFS can forward, by using a flow table, a packet to be sent to an OFC to the OFC. By using the OFS in-band communication method and the OFS in the present invention, control plane signaling and forwarding plane data are carried in a same OpenFlow network, and network communication can be implemented by maintaining only one network management system, which reduces networking costs.

A person of ordinary skill in the art may understand that, each aspect of the present invention or a possible implementation manner of each aspect may be specifically implemented as a system, a method, or a computer program product. Therefore, each aspect of the present invention or the possible implementation manner of each aspect may use a form of a complete hardware embodiment, a complete software embodiment (including firmware, resident software, and the like) or an embodiment combining software and hardware, which is uniformly referred to as "circuit", "module" or "system". In addition, each aspect of the present invention or the possible implementation manner of each aspect may take a form of a computer program product, where the computer program product refers to computer-readable program code stored in a computer-readable medium.

The computer-readable medium may be a computer-readable signal medium or a computer-readable storage medium. The computer readable storage medium includes but is not limited to an electronic, a magnetic, an optical, an electromagnetic, an infrared or a semiconductor system, device or apparatus or any proper combination thereof, such as a random access memory (RAM), a read-only memory (ROM), an erasable programmable read-only memory (EPROM or flash memory), an optical fiber, a portable read-only memory (CD-ROM).

A processor in the computer reads the computer-readable program code in the computer-readable medium, so that the processor can execute a functional action specified in each step or a combination of steps in a flowchart, and generate an apparatus that implements a functional action specified in each block or a combination of blocks in a block diagram.

The computer readable program code may be partly or completely performed on a computer of a user, performed as an independent software package, partly performed on the computer of the user and partly performed on a remote computer, or be completely performed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may be executed almost at the same time, or these blocks may sometimes be executed in reverse order.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. An OpenFlow switch (OFS) in-band communication method, wherein the method is executed by an OFS, the OFS comprises a controller list, the controller list is used to store one or more controller list entries, the controller list entry comprises a MAC and an IP of a local OpenFlow controller (OFC), and a port number that is corresponding to the MAC and the IP of the local OFC and is used when the OFS receives a Link Layer Discovery Protocol (LLDP) data packet sent by the OFC, and the method comprises:

receiving the LLDP data packet, wherein the LLDP data packet comprises a MAC, an IP, and a role sub-field of a sender, wherein the role sub-field is used to identify a sender type; and creating a controller list entry or updating the controller list entry when it is determined, by using the role sub-field, that a sender type of the received LLDP data packet is OFC, wherein the created controller list entry or the updated controller list entry comprises a MAC and an IP of the local OFC that are carried in the LLDP data packet, and a port in_port through which the LLDP data packet is received; and acquiring a first-time TCP handshake packet used for establishing a TCP connection; checking, according to a destination MAC and a destination IP that are carried in the TCP handshake packet, whether a corresponding controller list entry exists in the controller list; and if yes, updating a flow entry according to the MAC, the IP, and the in_port in the corresponding controller list entry in the controller list, so that the OFS can forward, by using a flow table, a packet to be sent to an OFC to the OFC.

2. The method according to claim 1, wherein the method further comprises the following step:

broadcasting the LLDP data packet whose sender type is OFC, so that another OFS can also execute the step of receiving the LLDP data packet, wherein the LLDP data packet comprises a MAC, an IP, and a role sub-field of a sender, wherein the role sub-field is used to identify a sender type; and the step of creating a controller list entry or updating the controller list entry when it is determined, by using the role sub-field, that a sender type of the received LLDP data packet is OFC, wherein the created controller list entry or the updated controller list entry comprises a MAC and an IP of the local OFC that are carried in the LLDP data packet, and a port in_port through which the LLDP data packet is received.

3. The method according to claim 1, wherein the role sub-field is located in a tag-length-value (TLV) field in the LLDP data packet.

4. The method according to claim 1, wherein:
the OFS comprises a hardware module and a software module;
the receiving the LLDP data packet is specifically: receiving, by the hardware module of the OFS, the LLDP data packet, querying the flow table according to the received LLDP data packet, generating an LLDP-type packet_in message, and sending the LLDP-type packet_in message to the software module;
a process of obtaining the role sub-field is as follows:
receiving, by the software module of the OFS, a packet_in message sent by the hardware module, and parsing the packet_in message to determine whether the packet_in message is the LLDP-type packet_in message; and
when it is determined that the packet_in message is the LLDP-type packet_in message, obtaining, by the software module of the OFS, the LLDP data packet by parsing the LLDP-type packet_in message, and obtaining the role sub-field by parsing a TLV field in the LLDP data packet; and the creating a controller list entry or updating the controller list entry specifically comprises:
obtaining, by the software module of the OFS, the MAC and the IP of the sender by parsing the TLV field in the LLDP data packet, and obtaining, by parsing the LLDP-type packet_in message, the port in_port through which the OFS receives the LLDP data packet;
querying, by the software module of the OFS, the controller list to determine whether a controller list entry that matches the MAC and the IP that are obtained by means of parsing exists; and if not, creating a controller list entry to record the MAC, the IP, and the in_port that are obtained by means of parsing, setting a predefined aging time, and then using a packet_out message to FLOOD the LLDP data packet; or if yes,
determining, by the software module of the OFS, whether an in_port in the controller list entry that matches the MAC and the IP that are obtained by means of parsing is the same as the in_port obtained by means of parsing; and if the same, resetting an aging time corresponding to the controller list entry to the predefined aging time, and then using a packet_out message to FLOOD the LLDP data packet; or if different,
further determining, by the software module of the OFS, whether the aging time corresponding to the controller list entry arrives; and if yes, changing the in_port in the controller list entry to the in_port obtained by means of parsing, and then using a packet_out message to FLOOD the LLDP data packet; or if not,
discarding, by the software module of the OFS, the LLDP data packet.

5. The method according to claim 1, wherein:
the OFS comprises a hardware module and a software module; and
the acquiring a first-time TCP handshake packet used for establishing a TCP connection; checking, according to a destination MAC and a destination IP that are carried in the TCP handshake packet, whether a corresponding controller list entry exists in the controller list; and if yes, updating a flow entry according to the MAC, the IP, and the in_port in the corresponding controller list entry in the controller list, so that the OFS can forward, by using a flow table, a packet to be sent to an OFC to the OFC specifically comprises:
receiving, by the hardware module of the OFS, the first-time TCP handshake packet used for establishing a TCP connection; parsing the first-time TCP handshake packet to obtain the destination MAC and the destination IP; querying the flow table according to the destination MAC and the destination IP that are obtained by means of parsing; generating a TCP-type packet_in message; and sending the TCP-type packet_in message to the software module;
receiving, by the software module of the OFS, a packet_in message sent by the hardware module, and parsing the packet_in message to determine whether the packet_in message is the TCP-type packet_in message;
when it is determined that the packet_in message is the TCP-type packet_in message, obtaining, by the software module of the OFS, the first-time TCP handshake packet by parsing the TCP-type packet_in message, and obtaining a source MAC, a source IP, the destination MAC, and the destination IP by parsing the first-time TCP handshake packet;
querying, by the software module of the OFS according to the destination MAC and the destination IP that are obtained by means of parsing, the controller list to determine whether a controller list entry that matches the destination MAC and the destination IP that are obtained by means of parsing exists, and if yes, generating a first flow entry and a second flow entry, and sending the first flow entry and the second flow entry to the hardware module of the OFS, wherein the first flow entry records that: a source MAC is the source MAC obtained by means of parsing, a source IP is the source IP obtained by means of parsing, a destination MAC is the destination MAC obtained by means of parsing, a destination IP is the destination IP obtained by means of parsing, and a forwarding port is the in_port in the controller list entry that matches the destination MAC and the destination IP that are obtained by means of parsing; and the second entry records that: a source MAC is the destination MAC obtained by means of parsing, a source IP is the destination IP obtained by means of parsing, a destination MAC is the source MAC obtained by means of parsing, a destination IP is the source IP obtained by means of parsing, and a forwarding port is the in_port field in the TCP-type packet_in message; and receiving, by the hardware module of the OFS, the first flow entry and the second flow entry, and adding the first flow entry and the second flow entry to the flow table.

6. The method according to claim 5, wherein:
when the controller list entry that matches the destination MAC and the destination IP that are obtained by means of parsing exists in the controller list, the method further comprises the following steps:
generating, by the software module of the OFS, a packet-out message, and sending the packet-out message to the hardware module of the OFS, wherein an action action field in the packet-out message points to the flow table; and
parsing, by the hardware module of the OFS, the packet-out message to obtain the first-time TCP handshake packet_in the packet-out message, parsing the first-time TCP handshake packet to obtain the destination MAC and the destination IP, querying, according to the destination MAC and the destination IP that are obtained by means of parsing, the flow table to find a flow entry that matches the destination MAC and the destination IP that are obtained by means of parsing, and forwarding the first-time TCP handshake packet according to a forwarding port in the flow entry.

7. The method according to claim 5, wherein:
when the entry that matches the destination MAC and the destination IP that are obtained by means of parsing does not exist in the controller list, the method further comprises the following step:
sending, by the software module of the OFS, the TCP-type packet_in message through a management port of the OFS.

8. The method according to claim 1, wherein the method further comprises:
adding, by the OFS, a first initial flow entry to the flow table, wherein a destination address of the first initial flow entry is an LLDP protocol multicast address, a protocol type is LLDP protocol type coding, a forwarding port points to an OFC, a data packet length is a length of a full packet, and a priority is the lowest.

9. The method according to claim 1, wherein the method further comprises:
adding, by the OFS, a second initial flow entry to the flow table, wherein a destination address of the second initial flow entry is a local address, a protocol type is TCP protocol type coding, a forwarding port points to a management port of the OFS, a data packet length is a length of a full packet, and a priority is the lowest.

10. The method according to claim 1, wherein:
the OFS further comprises a neighbor list, the neighbor list comprises one or more neighbor list entries, and the neighbor list entry comprises a MAC and an IP of another OFS, and a port number that is corresponding to the MAC and the IP of the another OFS and is used when the OFS receives an LLDP data packet sent by the another OFS; and
when it is determined, by using the role sub-field, that a sender type of the received LLDP data packet is OFS, the method further comprises the following steps:
obtaining, by a software module of the OFS, the MAC and the IP of the sender by parsing a TLV field in the LLDP data packet, and obtaining, by parsing an LLDP-type packet_in message, a port in_port through which the OFS receives the LLDP data packet;
querying, by the software module of the OFS, the neighbor list to determine whether a neighbor list entry that matches the MAC and the IP that are obtained by means of parsing exists; and if not, creating a neighbor list entry in the neighbor list to record the MAC, the IP, and the in_port that are obtained by means of parsing, and then using a packet_out message to FLOOD the LLDP data packet; or if yes,
determining whether an in_port corresponding to the neighbor list entry that matches the MAC and the IP that are obtained by means of parsing is the same as the in_port obtained by means of parsing; and if the same, using a packet_out message to FLOOD the LLDP data packet; or if different,
changing the in_port corresponding to the neighbor list entry to the in_port obtained by means of parsing, and then discarding the LLDP data packet.

11. The method according to claim 10, wherein the method further comprises the following steps:
sending, by the OFS, the neighbor list to an OFC, so that the OFC establishes a global network topology according to the neighbor list; and
when the neighbor list changes, sending, by the OFS, the changed neighbor list to the OFC, so that the OFC updates the global network topology according to the changed neighbor list.

12. The method according to claim 1, wherein the packets to be sent to the OFC comprise both a third-time TCP handshake packet and a data packet to be sent by another OFS to the OFC.

13. An OpenFlow Switch (OFS), comprising: a processor, a memory, and a communication interface, wherein
the memory is configured to store one or more controller list entries, wherein the controller list entry comprises a MAC and an IP of a local OpenFlow controller (OFC), and a port number that is corresponding to the MAC and the IP of the local OFC and is used when the OFS receives a Link Layer Discovery Protocol (LLDP) data packet sent by the OFC;
the communication interface is configured to receive the LLDP data packet, wherein the LLDP data packet comprises a MAC, an IP, and a role sub-field of a sender, wherein the role sub-field is used to identify a sender type; and
the processor is configured to create a controller list entry or update the controller list entry when it is determined, by using the role sub-field, that a sender type of the received LLDP data packet is OFC, wherein the created controller list entry or the updated controller list entry comprises a MAC and an IP of the local OFC that are carried in the LLDP data packet, and a port in_port through which the LLDP data packet is received; and the communication interface is further configured to: acquire a first-time TCP handshake packet used for establishing a TCP connection; check, according to a destination MAC and a destination IP that are carried in the TCP handshake packet, whether a corresponding controller list entry exists in the controller list; and if yes, update a flow entry according to a MAC, an IP, and an in_port in the corresponding controller list entry in the controller list, so that the OFS can forward, by using a flow table, a packet to be sent to an OFC to the OFC.

14. The OFS according to claim 13, wherein:

the communication interface is further configured to broadcast the LLDP data packet whose sender type is OFC, so that another OFS can also receive the LLDP data packet, wherein the LLDP data packet comprises the MAC, the IP, and the role sub-field of the sender, wherein the role sub-field is used to identify the sender type; and create the controller list entry or update the controller list entry when it is determined, by using the role sub-field, that the sender type of the received LLDP data packet is OFC, wherein the created controller list entry or the updated controller list entry comprises the MAC and the IP of the local OFC that are carried in the LLDP data packet, and the port in_port through which the LLDP data packet is received.

15. The OFS according to claim 13, wherein the role sub-field is located in a tag-length-value (TLV) field in the LLDP data packet.

16. The OFS according to claim 13, wherein:

the communication interface is specifically configured to: receive the LLDP data packet, query the flow table according to the received LLDP data packet, generate an LLDP-type packet_in message, and send the LLDP-type packet_in message to a data path; and the processor is specifically configured to:
acquire a packet_in message from the data path, and parse the packet_in message to determine whether the packet_in message is the LLDP-type packet_in message;
when the packet_in message is the LLDP-type packet_in message, obtain the LLDP data packet by parsing the LLDP-type packet_in message, and obtain the role sub-field by parsing a TLV field in the LLDP data packet; obtain the MAC and the IP of the sender by parsing the TLV field in the LLDP data packet, and obtain, by parsing the LLDP-type packet_in message, the port in_port through which the OFS receives the LLDP data packet; and
query the controller list to determine whether a controller list entry that matches the MAC and the IP that are obtained by means of parsing exists; and if not, create a controller list entry to record the MAC, the IP, and the in_port that are obtained by means of parsing, set a predefined aging time, and then use a packet_out message to FLOOD the LLDP data packet; or if yes,
determine whether the in_port in the controller list entry that matches the MAC and the IP that are obtained by means of parsing is the same as the in_port obtained by means of parsing; and if the same, reset an aging time corresponding to the controller list entry to the predefined aging time, and then use a packet_out message to FLOOD the LLDP data packet; or if different,
further determine whether the aging time corresponding to the controller list entry arrives; and if yes, change the in_port in the controller list entry to the in_port obtained by means of parsing, and then use a packet_out message to FLOOD the LLDP data packet; or if not,
discard the LLDP data packet.

17. The OFS according to claim 13, wherein the communication interface is further configured to: receive the first-time TCP handshake packet used for establishing a TCP connection, parse the first-time TCP handshake packet to obtain the destination MAC and the destination IP, query the flow table according to the destination MAC and the destination IP that are obtained by means of parsing, generate a TCP-type packet_in message, and send the TCP-type packet_in message to a data path; and the communication interface is further configured to:
acquire a packet_in message from the data path, and parse the packet_in message to determine whether the packet_in message is the TCP-type packet_in message;
when the packet_in message is the TCP-type packet_in message, obtain the first-time TCP handshake packet by parsing the TCP-type packet_in message, and obtain a source MAC, a source IP, the destination MAC, and the destination IP by parsing the first-time TCP handshake packet; and
query, according to the destination MAC and the destination IP that are obtained by means of parsing, the controller list to determine whether a controller list entry that matches the destination MAC and the destination IP that are obtained by means of parsing exists, and if yes, generate a first flow entry and a second flow entry and send the first flow entry and the second flow entry to the first handshake packet module, wherein the first flow entry records that: a source MAC is the source MAC obtained by means of parsing, a source IP is the source IP obtained by means of parsing, a destination MAC is the destination MAC obtained by means of parsing, a destination IP is the destination IP obtained by means of parsing, and a forwarding port is the in_port in the controller list entry that matches the destination MAC and the destination IP that are obtained by means of parsing; and the second flow entry records that: a source MAC is the destination MAC obtained by means of parsing, a source IP is the destination IP obtained by means of parsing, a destination MAC is the source MAC obtained by means of parsing, a destination IP is the source IP obtained by means of parsing, and a forwarding port is an in_port field in the TCP-type packet_in message; and
receive the first flow entry and the second flow entry, and add the first flow entry and the second flow entry to the flow table.

18. The OFS according to claim 17, wherein:

the communication interface is further configured to:
when the controller list entry that matches the destination MAC and the destination IP that are obtained by means of parsing exists in the controller list, generate a packet-out message, and send the packet-out message to the first handshake packet module, wherein an action action field in the packet-out message points to the flow table; and the communication interface is further configured to: parse the packet-out message to obtain the first-time TCP handshake packet in the packet-out message, parse the first-time TCP handshake packet to obtain the destination MAC and the destination IP, query, according to the destination MAC and the destination IP that are obtained by means of parsing, the flow table to find a flow entry that matches the destination MAC and the destination IP that are obtained by means of parsing, and forward the first-time TCP handshake packet according to a forwarding port in the flow entry.

19. The OFS according to claim 17, wherein:

the communication interface is further configured to: when the entry that matches the destination MAC and the destination IP that are obtained by means of parsing does not exist in the controller list, send the TCP-type packet_in message through a management port of the OFS.

20. The OFS according to claim 13, wherein the OFS further comprises:

the processor is configured to add a first initial flow entry to the flow table, wherein a destination address of the first initial flow entry is an LLDP protocol multicast address, a protocol type is LLDP protocol type coding, a forwarding port points to an OFC, a data packet length is a length of a full packet, and a priority is the lowest.

21. The OFS according to claim 13, wherein:

the processor is further configured to add a second initial flow entry to the flow table, wherein a destination address of the second initial flow entry is a local address, a protocol type is TCP protocol type coding, a forwarding port points to a management port of the OFS, a data packet length is a length of a full packet, and a priority is the lowest.

22. The OFS according to claim 13, wherein the packets to be sent to the OFC comprise both a third-time TCP handshake packet and a data packet to be sent by another OFS to the OFC.

* * * * *